Aug. 25, 1964 H. ROGLER 3,145,781
TRACTOR ARRANGEMENT
Filed Sept. 20, 1961 3 Sheets-Sheet 1
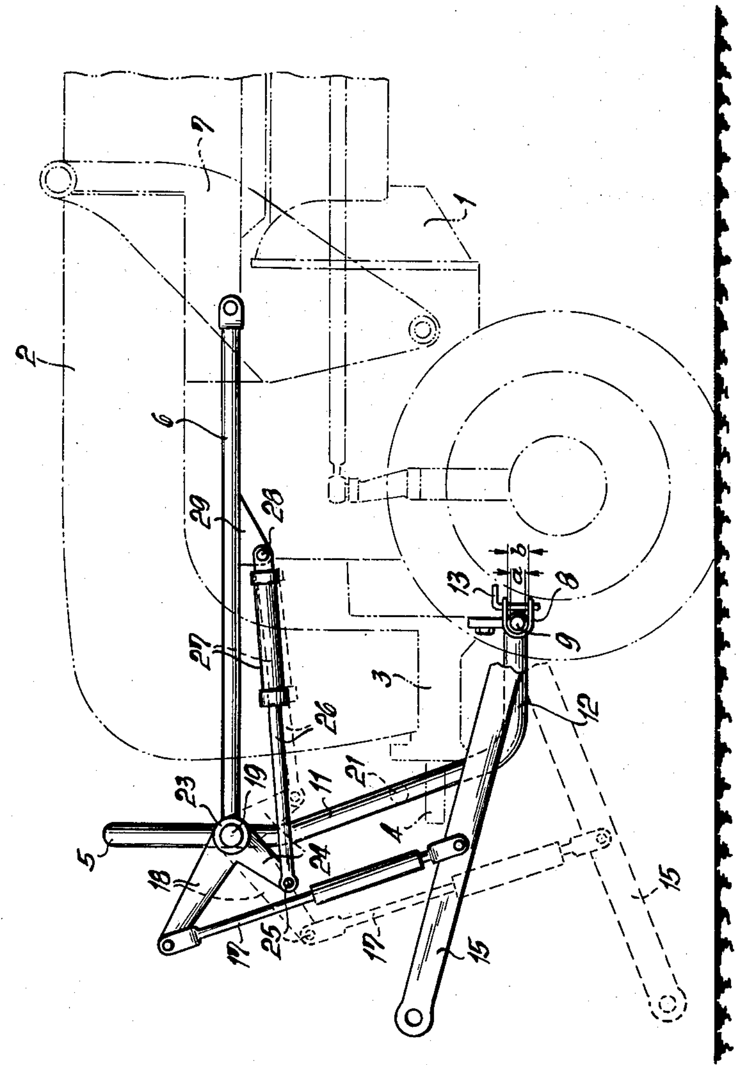
INVENTOR
Heinz ROGLER
BY Dicke and Craig
ATTORNEYS Aug. 25, 1964 H. ROGLER 3,145,781
TRACTOR ARRANGEMENT
Filed Sept. 20, 1961 3 Sheets-Sheet 2
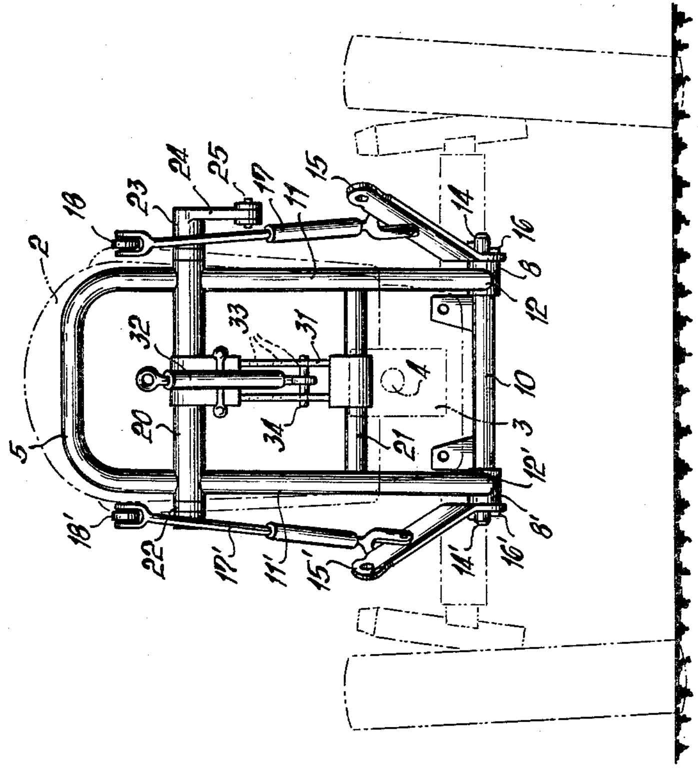
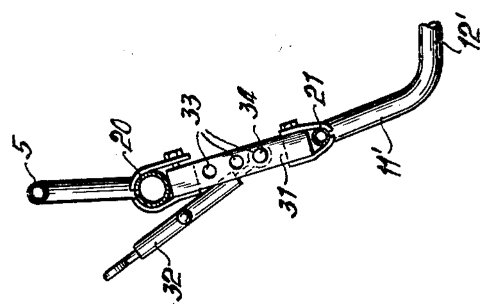
INVENTOR
Heinz ROGLER
BY Dicke and Craig
ATTORNEYS Aug. 25, 1964 H. ROGLER 3,145,781
TRACTOR ARRANGEMENT
Filed Sept. 20, 1961 3 Sheets-Sheet 3
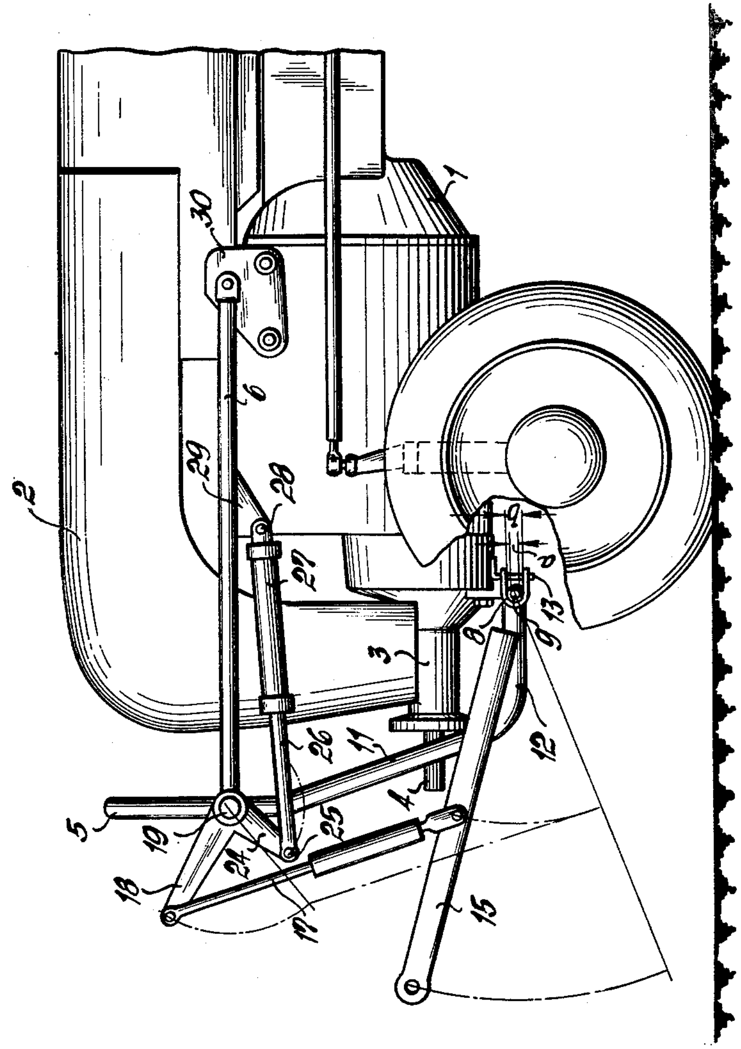
INVENTOR
Heinz ROGLER
BY Dicke & Craig
ATTORNEYS

United States Patent Office 3,145,781
Patented Aug. 25, 1964

1

3,145,781

TRACTOR ARRANGEMENT

Heinz Rogler, Lindau-Hege (Bodensee), Germany, assignor to Firma Porsche-Diesel-Motorenbau G.m.b.H., Friedrichshafen (Bodensee), Germany Filed Sept. 20, 1961, Ser. No. 139,439
14 Claims. (Cl. 172—276)

The present invention relates to a suspension arrangement for working implements coupled to the front of an agricultural tractor in front thereof in the driving direction by means of three connecting members in the form of a three-point linkage which implements are adapted to be lifted or lowerd by means of this suspension arrangement and therewith may be brought into the working position thereof.

Constructions are known in the prior art in which there are arranged in front of the vehicle hydraulically-actuated support rails adapted to be swung or pivoted in the vertical plane to which may be coupled the implements and which, in enlargement of the simple base form thereof, possess at the support rail fish plates adapted to be matched by an adjusting cylinder to the different implement widths. It is also known in the prior art to utilize as implement supports, attachment support rails which are guided by a parallelogram linkage whereby the suspension of the parallelogram was so chosen that front implements could be attached with the support rail swung forwardly and inter-axle implements could be attached with the rail swung rearwardly.

These prior art constructions satisfied to date the substantially small area of utilization of front working implements, in which a rapid mounting did not play as essential a role. Furthermore, oftentimes there did not exist at all the need to install, attached to the front of a tractor, an implement normally attached to the rear by means of a three-point linkage and therewith to relieve the rear three-point suspension for a second implement. Since the hydraulic power lift with three-point suspension at the argicultural tractor is here to stay, it represents an absolute necessity to make available for the large number of implements the installation of which is also possible in front of the tractor within the field of vision of the driver, the same simple attachment parts for front and rear installation thereof. The installation of implements adapted to be attached to the tractor by a rear-three-point suspension was, for all practical purposes, impossible with the aforementioned front support-rail in front of the tractor, and if possible at all, then only with the use of additional structural parts.

The disadvantages of the known prior art constructions are avoided in accordance with the present invention by arranging at the front end of the tractor two lower and one upper connecting members, a shifting shaft and a working cylinder which together correspond in the construction and arrangement thereof to the rear-three-point suspension of a tractor for the accommodation and actuation of conventional so-called "three-point" implements. A protective bow member as well as parts for the fastening thereof at the tractor are used as base frame for the accommodation of the three-point guide mechanism, the shifting shaft and the working cylinder. Protective bow members for the outer body panels are necessary if the tractor is equipped with one of the known front-loader implements by means of which loose or bulk materials are picked up for purposes of removal and transportation from a storage place and are dumped onto a vehicle as the driver usually attempts to approach as closely as possible to the storage surface and thereby might cause unintentional indentations into the body

2 panels. The front three-point attachment frame is so designed in accordance with the present invention that, insofar as an implement suspension is not wanted, on the one hand, it fulfills completely and fully, by omission of the bearing support for the upper connecting link, of the shifting or lifting shaft and of the working cylinder, without any excessive material expenditures the function of body protection, and, on the other hand, it represents, insofar as the presence of a protective bow member is not necessary, a minimum in material expenditures for a sufficiently rigid base frame for the front three-point suspension.

The protective bow member consists advantageously of a frame of tubular cross section which exhibits in plan view a rectangular form and is supported in front of the body whereby the lower of the two smaller sides of the frame is open. As viewed in side view, the frame, in the upper part thereof, approximately adapts itself to the contour of the hood at a distance therefrom whereas the lower ends of the longitudinal sides of the frame are angularly bent about an approximately right angle rearwardly as viewed in the driving direction of the tractor.

Forked pieces are advantageously welded to the free ends of the two leg portions, which are angularly bent rearwardly in the driving direction, to permit rapid coupling and uncoupling. The forked pieces are open in the horizontal plane toward the rear in the pressure direction of the frame. In order to avoid any sliding-off on the part of the forked pieces from the coupling shaft, the upper and lower prong portions of each forked piece are provided with aligned bores for accommodating therein a securing plug.

In order to construct the frame sufficiently resistant against torsion, the two longitudinal sides of the frame are interconnected by means of two parallel welded-in webs arranged at right angles thereto and at a distance from each other. According to the present invention, the two cross-connecting webs simultaneously serve to support the bearing support for the upper of the three connecting members. The bearing support is detachably clamped with its ends at the webs in the center between the longitudinal sides of the frame and parallel thereto, and is provided within the flat bridging web portions which extend from each other at a constant distance with transverse bores arranged one above the other and mutually aligned. By the use of such an arrangement the upper of the three-point connecting members may be changed to several different heights with respect to the coupling point thereof on the side of the tractor.

The upper of the two cross-connecting webs of the frame is so constructed in accordance with the present invention that it serves, in the form of a tubular member, for the accommodation and bearing support of the shifting shaft. The axial movability of the shaft is limited by means of sleeves placed over the ends of the shaft and corresponding in outer diameter to the tubular bearing member which sleeves are secured against relative rotation on the shaft by means of pins or the like. Each sleeve carries a lifting arm which is operatively connected by means of a lifting rod adapted to be changed in its length with one of the two lower three-point guide members whereas a power or servo-arm is secured at only one sleeve with which also engages the piston rod of the working cylinder.

In proximity to the front axle, in the illustrated embodiment in front thereof at the bearing support for the front take-off shaft, there are arranged axle stubs, in the present construction formed by the two ends of a continuous shaft. The lower frame part together with its forked pieces is emplaced from in front over the larger diameter of the axle stubs and is secured to the rear of the axle stub by means of a plug member each inserted into the forked pieces. One lower connecting member each is placed on the left and right side over the outer axle ends of smaller diameter adjoining the forked pieces in the axial direction with respect thereto and is also secured against loss. During the lifting or lowering operation of the attached implement, the lower connecting members slide along the longitudinal sides of the frame on the outside thereof and therewith produce the effect, otherwise obtained by chains, of a limitation of the lateral swinging range of the implement.

The frame is rigidly connected in the upper area thereof with the load-lifter bearing support by means of a right and left connecting rod each which are secured at the frame and which extend to the rear approximately parallel to the vehicle longitudinal axis, laterally at a distance to the outer body and approximately horizontally. A simple and adequate fixing of the frame with respect to its support on the axle journals or axle stub is attained thereby. If a front three-point suspension is to be installed, without the intention of utilizing a front-loader, then the load-lifter bearing support is replaced by a very simple securing bracket.

One of the two lateral connecting rods for the fixing of the frame possesses a holder at which is pivotally secured the part of the working cylinder disposed on the side of the housing whereas the end of the working cylinder disposed on the side of the piston is operatively connected with the power or servo-arm of the shifting or lifting shaft. The working cylinder may be operative both hydraulically or pneumatically as a simple or double-acting element and is advantageously arranged corresponding to the holder below the connecting rod. In addition to the hydraulic or pneumatic power source and with omission of the cylinder, a mechanical arrangement, for example, by means of a cable through a ratchet or by means of a linkage may cause the lifting and lowering operations of the implement attached in a three-point suspension.

Accordingly, it is an object of the present invention to provide an agricultural tractor to the front of which may be attached, in a simple manner, agricultural implements and which avoids the inadequacies and shortcomings of the priod art constructions.

It is another object of the present invention to provide a three-point suspension for the attachment to the front of a tractor of implements also adapted to be attached to the rear thereof in a three-point suspension.

Still a further object of the present invention resides in the provision of a three-point suspension for the attachment to the front of tractors of agricultural implements which is simple in construction, sturdy, and permits ready attachment and detachment of the implements.

A still further object of the present invention resides in the provision of a three-point suspension enabling the attachment to the front of a tractor of agricultural implements which utilizes a protective member that adequately protects the outer body panels of the tractor and which, notwithstanding its satisfactory protective features involves relatively low expenditures in material.

A further object of the present invention resides in the provision of a three-point suspension for the front of a tractor which permits the interchangeable use of agricultural implements adapted to be suspended from the tractor either at the rear or at the front thereof.

These and other objects, features and advantages of the present invention will become more obvious from the following description when taken in connection with the accompanying drawing which shows, for purposes of illustration only, one embodiment in accordance with the present invention, and wherein FIGURE 1 is a side elevational view of the front portion of an agricultural tractor provided with a front three-point suspension according to the present invention illustrated in the raised condition thereof whereby the lower connecting member is broken off, for clarity's sake, in front of its connecting point with the tractor;

FIGURE 2 is a partial longitudinal cross sectional view, as viewed from the side of the tractor, through the frame of the three-point suspension in accordance with the present invention provided with the bearing support for the upper one of the three connecting members;

FIGURE 3 is a front elevational view of a tractor provided with a front three-point suspension in accordance with the present invention including the upper connecting link, and FIGURE 4 is a side elevational view of the front portion of the tractor showing an alternative supporting means for the connecting rods shown in FIGURE 1.

Referring now to the drawing wherein like reference numerals are used throughout the various views to designate corresponding parts, reference numeral 1 designates in FIGURE 1 the tractor provided with appropriate outer body panels 2. The take-off shaft bearing support 3 for the front take-off shaft 4 is located at the front end of the tractor 1. The protective bow member 5 protecting the tractor body is secured by means of a right and left connecting rod 6 at the right and left load-lifter bearing plates 7 and by means of the forked portions 8 on the journals 9 of the shaft or axle 10. The protective bow member 5 for protecting the hood consists of the longitudinal parts 11 and 11' forming the longitudinal sides thereof and the leg portions 12 and 12' angularly bent rearwardly to the free ends of which are welded the forked pieces 8 and 8' of essentially U-shape. The upper and lower leg portions of the forked pieces 8 and 8' are provided with bores arranged in mutual alignment into which are inserted securing bolts 13 to prevent unintentional disengagement of the protective bow member 5 from the tractor 1. The lower connecting members 15 and 15' are placed axially over the ends 14 and 14' of the shaft stub or journals of which the diameter $a$ is smaller than the journal diameter $b$ within the area of the forked pieces 8 and 8'. The lower connecting members or links 15 and 15' are secured against inadvertent loss by means of a plug member 16 and 16' of appropriate conventional construction. The lower connecting members 15 and 15' are operatively connected with the lift arms 18 and 18' of the shifting or lifting shaft 19 by means of the lifting rods 17 and 17' which are adapted to be adjusted in length thereof by means of a threaded connection provided in each rod 17 and 17'.

The two web elements 20 and 21 (FIGURES 2 and 3) are welded-in for purposes of reinforcing the protective bow member 5 whereby the web 20 is formed by a pipe or tubular member which serves simultaneously for the accommodation and bearing support of the shifting or lifting shaft 19. Sleeves 22 and 23 are placed over the ends of the shifting or lifting shaft 19 projecting out of the tubular web 20 and are secured against relative rotation with respect thereto by any appropriate means such as pins, keys or the like. A lifting arm 18' is securely welded to the sleeve 22 and the lifting arm 18 as well as the power arm 24 is securely welded to the sleeve 23.

The free end of the piston rod 26 constructed in a fork-shaped manner of the working cylinder 27 is supported on a bolt 25 of the servo-arm 24. The working cylinder 27 itself is pivotally arranged on the pin 28 of a bracket 29 which in turn is arranged at the connecting rod 6. The load-lifter bearing plates 7 to which are secured the connecting rods 6 may be replaced, in case no front-loader is to be provided by simple attachment brackets 30 of which one is shown in FIGURE 4. The bearing support 31 for the upper connecting link 32 is secured by appropriate clamping means of conventional construction at the connecting webs 20 and 21. The bearing support 31 constituted by two flat members arranged at a constant distance from each other is provided with bores 33 arranged one above the other whereby the upper connecting link 32 may be adjusted to positions of different height by means of a plug-in bolt 34.

It is believed that the operation of the three-point power-lift suspension in accordance with the present invention is obvious so that a detailed description thereof is dispensed with therein.

While I have shown and described one embodiment in accordance with the present invention, it is understood that the same is not limited thereto but is susceptible of many changes and modifications within the scope thereof. For example, insofar as the conditions at the tractor permit it, the lower connecting members of the three-point suspension may also be pivotally connected above or behind the front axle in which case the bearing journals are not constituted by a continuous shaft but are secured at right and left fixtures arranged at appropriate frame parts. Additionally, any conventional control system may be utilized for the power-lift system to selectively raise and lower the agricultural implement. If the capacity of a single working cylinder for the operation of the implements attached at the three-point suspension in front is not sufficient, it is possible to provide without any difficulty in the manner relative to and with the connections disclosed in the above described cylinder, a second working cylinder at the right side of the vehicle.

Thus, it is obvious that the present invention is not limited to the details shown and described herein but may be modified in numerous ways without departing from the spirit and scope thereof, and I therefore do not wish to be limited to the details shown and described herein but intend to cover all such changes and modifications as are encompassed by the scope of the appended claims.

I claim:

1. A suspension arrangement for suspending agricultural implements from a tractor in front thereof as viewed in the driving direction by means of a three-point suspension linkage, comprising three point suspension means including a plurality of connecting members, said connecting members comprising an upper connecting member and two lower connecting members adapted to be connected to an agricultural implement, means to enable selectively raising and lowering of the agricultural implement including fluid-pressure actuated piston and cylinder means and rotatable lifting shaft means operatively connected to said piston and cylinder means for operation thereby, means including lifting rod means operatively connecting said two lower connecting members with said rotatable lifting shaft means, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including said upper member and said two lower members, said connecting members, said working cylinder and piston means and said lifting shaft means at said protective bow-shaped means and at least at some of the securing parts thereof, said protective bow-shaped means including a frame having an essentially rectangular configuration as viewed in plan view, of which the lower relatively shorter side is open and of which the relatively longer side members are angularly bent rearwardly at an approximately right angle.

2. A suspension arrangement for suspending agricultural implements from a tractor in front thereof as viewed in the driving direction by means of a three-point suspension linkage, comprising three point suspension means having a plurality of connecting members, means to enable selectively raising and lowering of the agricultural implement adapted to be attached to said suspension means including fluid-pressure actuated piston and cylinder means and lifting shaft means, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including at least some of said connecting members, said working cylinder and piston means and said lifting shaft means at said protective bow-shaped means and at least at some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug.

3. A suspension arrangement for suspending agricultural implements from a tractor in front thereof as viewed in the driving direction by means of a three-point suspension linkage, comprising three point suspension means having a plurality of connecting members including an upper connecting member, means to enable selectively raising and lowering of the agricultural implement adapted to be attached to said suspension means including fluid-pressure actuated piston and cylinder means and lifting shaft means, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including at least some of said connecting members, said working cylinder and piston means and said lifting shaft means at said protective bow-shaped means and at least at some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug, two web members disposed at a distance substantially parallel to each other and reinforcingly interconnecting the side frame members, said two web members being welded to said side frame members in substantially rectangular relationship thereto, and bearing support means for the upper one of said connecting members disposed substantially in the center of and substantially parallel to said frame side members, said bearing support means effectively providing a plurality of bores disposed one above the other.

4. A suspension arrangement for suspending agricultural implements from a tractor in front thereof as viewed in the driving direction by means of a three-point suspension linkage, comprising three point suspension means having a plurality of connecting members including an upper connecting member, means to enable selectively raising and lowering of the agricultural implement adapted to be attached to said suspension means including fluid-pressure actuated piston and cylinder means and lifting shaft means, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including at least some of said connecting members, said working cylinder and piston means and said lifting shaft means at said protective bow-shaped means and at least some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug, two web members disposed at a distance substantially parallel to each other and reinforcingly interconnecting the side frame members, said two web members being welded to said side frame members in substantially rectangular relationship thereto, and bearing support means for the upper one of said connecting members disposed substantially in the center of and substantially parallel to said frame side members, said bearing support means effectively providing a plurality of bores disposed one above the other, and clamping means for clampingly connecting the ends of said bearing support means at said web members.

5. A suspension arrangement for suspending agricultural implements from a tractor in front thereof as viewed in the driving direction by means of a three-point suspension linkage, comprising three point suspension means having a plurality of connecting members including an upper connecting member and two lower connecting members, means to enable selectively raising and lowering of the agricultural implement adapted to be attached to said suspension means including fluid-pressure actuated piston and cylinder means and lifting shaft means having a power arm and a right and left lifting arm, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including at least some of said connecting members, said working cylinder and piston means and said lifting shaft means at said protective bow-shaped means and at least at some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug, two web members disposed at a distance substantially parallel to each other and reinforcingly interconnecting the side frame members, said two web members being welded to said side frame members in substantially rectangular relationship thereto, and bearing support means for the upper one of said connecting members disposed substantially in the center of and substantially parallel to said frame side members, said bearing support means effectively providing a plurality of bores disposed one above the other, the upper one of said two connecting web members being constituted by a tubular member extending beyond the frame side members and serving as bearing support for accommodating therein said lifting shaft means, the piston rod of said piston means being operatively connected with said power arm, and lifting rod means for connecting a respective lifting arm with a corresponding lower connecting member.

6. A suspension arrangement for suspending agricultural implements from a tractor in front thereof as viewed in the driving direction by means of a three-point suspension linkage, comprising three point suspension means having a plurality of connecting members including an upper connecting member and two lower connecting members, means to enable selectively raising and lowering of the agricultural implement adapted to be attached to said suspension means including fluid-pressure actuated piston and cylinder means and lifting shaft means having a power arm and a right and left lifting arm, protective bow-shaped means arranged in front of the tractor body and extending substantially transversely to the driving direction thereof, means including securing parts for mounting said protective bow-shaped means on said tractor, and pivotal connecting means for pivotally connecting the suspension elements of said suspension means including at least some of said connecting members, said working cylinder and piston means and said lifting shaft means at said protective bow-shaped means and at least at some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug, two web members disposed at a distance substantially parallel to each other and reinforcingly interconnecting the side frame members, said two web members being welded to said side frame membres in substantially rectangular relationship thereto, and bearing support means for the upper one of said connecting members disposed substantially in the center of and substantially parallel to said frame side members, said bearing support means effectively providing a plurality of bores disposed one above the other, and clamping means for clampingly connecting the ends of said bearing support means at said web members, the upper one of said two connecting web members being constituted by a tubular member extending beyond the frame side members and serving as bearing support for accommodating therein said lifting shaft means, the piston rod of said piston means being operatively connected with said power arm, and lifting rod means for connecting a respective lifting arm with a corresponding lower connecting member.

7. A suspension arrangement for suspending agricultural implements from a tractor in front thereof as viewed in the driving direction by means of a three-point suspension linkage, comprising three point suspension means having a plurality of connecting members, actuating means operatively connected with said suspension means to enable selectively raising and lowering of the agricultural implement adapted to be attached to said suspension means including working cylinder means and lifting shaft means, protective bow-shaped means forming a supporting frame arranged in front of the tractor body and extending substantially transversely to the driving direction, said frame including angularly bent rearwardly extending leg portions having at the free ends thereof approximately U-shaped connecting pieces open in extension of said leg portions in an approximately horizontal plane, mounting means for mounting said protective bow-shaped means on said tractor, and means for pivotally connecting said three point suspension means consisting of at least some of the connecting members, the working cylinder means and the lifting shaft means at said protective bow-shaped means and at least at some of the parts of the mounting means thereof.

8. A suspension arrangement for suspending agricultural implements from a tractor having front axle means in front thereof as viewed in the driving direction by means of a three-point suspension linkage, comprising three point suspension means having a plurality of connecting members including an upper and two lower connecting members, actuating means operatively connected with said suspension means to enable selectively raising and lowering of the agricultural implement adapted to be attached to said suspension means including working cylinder means and lifting shaft means, protective bow-shaped means forming a supporting frame arranged in front of the tractor body and extending substantially transversely to the driving direction, said frame including angularly bent rearwardly extending leg portions having at the free ends thereof approximately U-shaped connecting pieces open in extension of said leg portions in an approximately horizontal plane, mounting means for mounting said protective bow-shaped means on said tractor including substantially horizontal and transversely extending shaft means near said front axle means, said U-shaped connecting pieces being placed over said transversely extending shaft means from in front thereof, said transversely extending shaft means being provided with journal portions of smaller diameter, and means for pivotally connecting said three point suspension means consisting of at least some of the connecting members, the working cylinder means and the lifting shaft means at said protective bow-shaped means and at least at some of the parts of the mounting means thereof including means for mounting and securing the ends of said lower connecting members near said tractor on said journal portions adjacent said connecting pieces.

9. A suspension arrangement for suspending agricultural implements from a tractor having front axle means in front thereof as viewed in the driving direction by means of a three-point suspension linkage, comprising three point suspension means having a plurality of connecting members including an upper and two lower connecting members, actuating means operatively connected with said suspension means to enable selectively raising and lower of the agricultural implement adapted to be attached to said suspension means including working cylinder means and lifting shaft means, protective bow-shaped means forming a supporting frame arranged in front of the tractor body and extending substantially transversely to the driving direction, said frame including angularly bent rearwardly extending leg portions having at the free ends thereof approximately U-shaped connecting pieces open in extension of said leg portions in an approximately horizontal plane, mounting means for mounting said protective bow-shaped means on said tractor including substantially horizontal and transversely extending shaft means near said front axle means, said U-shaped connecting pieces being placed over said transversely extending shaft means from in front thereof, said transversely extending shaft means being provided with journal portions of smaller diameter, and means for pivotally connecting said three point suspension means consisting of at least some of the connecting members, the working cylinder means and the lifting shaft means at said protective bow-shaped means and at least at some of the parts of the mounting means thereof including means for mounting and securing the ends of said lower connecting members near said tractor on said journal portions adjacent said connecting pieces, the lower connecting members sliding along the frame side members of said protective bow-shaped means, and said frame simultaneously serving as limit means of the lateral swinging range of the attached implement.

10. A suspension arrangement for suspending agricultural implements from a tractor in front thereof as viewed in the driving direction by means of a three-point suspension linkage, comprising three point suspension means including a plurality of connecting members, said connecting members comprising an upper connecting member and two lower connecting members, actuating means operatively connected with said suspension means to enable selective raising and lowering of the agricultural implement adapted to be attached to said upper connecting member and said two lower connecting members including working cylinder means and lifting shaft means, means including lifting rod means operatively connecting said lifting shaft means and said two lower connecting members, protective bow-shaped means arranged in front of the tractor body and extending substantially transversely to the driving direction, mounting means for mounting said protective bow-shaped means on said tractor including approximately horizontal, longitudinally extending rods and support means at said tractor for said rods, and means for pivotally connecting said three point suspension means including said upper connecting member and said two lower connecting members, the working cylinder means and the lifting shaft means at said protective bow-shaped means and at least at some of the parts of the mounting means thereof, said support means being constituted by load lifting bearing plates.

11. A suspension arrangement for suspending agricultural implements from a tractor in front thereof as viewed in the driving direction by means of a three-point suspension linkage, comprising three point suspension means including a plurality of connecting members, said connecting members including an upper connecting member and two lower connecting members, actuating means operatively, connected with said suspension means to enable selectively raising and lowering of the agricultural implement adapted to be attached to said upper connecting member and said two lower connecting members including working cylinder means having fluid-pressure actuated piston means and lifting shaft means, means including lifting rods operatively connecting said lifting shaft means and said two lower connecting members, protective bow-shaped means arranged in front of the tractor body and extending substantially transversely to the driving direction, mounting means for mounting said protective bow-shaped means on said tractor including approximately horizontal, longitudinally extending rods and support means at said tractor for said rods, one of said rods being provided with holder means for one of the two parts consisting of said piston and cylinder means, the other of said two parts being operatively connected with said lifting shaft means, said cylinder means extending in its axial direction substantially parallel and below said one rod, and means for pivotally connecting said three point suspension means including at least some of the connecting members, the working cylinder means and the lifting shaft means at said protective bow-shaped means and at least at some of the parts of the mounting means thereof, said support means being constituted by attachment brackets.

12. A suspension arrangement for suspending agricultural implements from a tractor in front thereof as viewed in the driving direction by means of a three-point suspension linkage, comprising three point suspension means including a plurality of connecting members, said connecting members comprising an upper connecting member and two lower connecting members, actuating means operatively connected with said suspension means to enable selectively raising and lowering of the agricultural implement adapted to be attached to said upper and lower connecting members including fluid-actuated cylinder and piston means, a rockable lifting shaft operatively connected to said cylinder and piston means for movements by the latter means about the axis of said shaft, means including lifting rods transmitting said movements of said lifting shaft to said two lower connecting members, a protective member arranged in front of the tractor body and extending substantially transversely to the driving direction, mounting means having a plurality of parts for mounting said protective member on said tractor, and means for pivotally supporting said upper connecting member and said lifting shaft on said protective member and means pivotally supporting said two lower members at least at some of said parts of said mounting means.

13. A suspension arrangement for suspending agricultural implements from a tractor in front thereof as viewed in the driving direction by means of a three-point suspension linkage, comprising three point suspension means having a plurality of connecting members including an upper connecting member and two lower connecting members, means to enable selectively raising and lowering of the agricultural implement adapted to be attached to said suspension means including fluid-pressure actuated piston and cylinder means and lifting shaft means having a power arm and a right and left lifting arm, protective bow-shaped means arranged in front of the tractor body and extending substantially transversely to the driving direction thereof, means including two substantially horizontal longitudinal connecting rods and securing parts for mounting said protective bow-shaped means on said tractor, means supporting said cylinder means at one of said connecting rods, and pivotal connecting means for pivotally connecting the suspension elements of said suspension means including at least some of said connecting members, said working cylinder and piston means and said lifting shaft means at said protective bow-shaped means and at least at some of the securing parts thereof, said protective bow-shaped means including a tubular frame having an essentially rectangular configuration as viewed in plan view, of which the lower relatively shorter side is open and of which the relatively longer side members are angularly bent rearwardly at an approximately right angle, the free rearwardly extending leg portions of said frame side members being each provided with a fork-like piece, the open end of each fork-like piece being disposed in a substantially horizontal plane in extension of said leg portions, and each fork-like piece having an upper part and a lower part provided with aligned apertures for the insertion of a respective securing plug, two web members disposed at a distance substantially parallel to each other and reinforcingly interconnecting the side frame members, said two web members being welded to said side frame members in substantially rectangular relationship thereto, and bearing support means for the upper one of said connecting members disposed substantially in the center of and substantially parallel to said frame side members, said bearing support means effectively providing a plurality of bores disposed one above the other, and clamping means for clampingly connecting the ends of said bearing support means at said web members, the upper one of said two connecting web members being constituted by a tubular member extending beyond the frame side members and serving as bearing support for accommodating therein said lifting shaft means, the piston rod of said piston means being operatively connected with said power arm, and lifting rod means for connecting a respective lifting arm with a corresponding lower connecting member.

14. A suspension arrangement for suspending agricultural implements from a tractor in front thereof as viewed in the driving direction by means of a three-point suspension linkage, comprising three point suspension means having a plurality of connecting members including an upper connecting member and two lower connecting members, means to enable selective raising and lowering of the agricultural implement adapted to be attached to said upper and lower connecting members including fluid-actuated cylinder and piston means, a rockable lifting shaft operatively connected with said cylinder and piston means for movements by the latter means about the axis of said shaft, means including lifting rods transmitting said movements of said lifting shaft to said two lower connecting members, a bow-shaped member, means including securing parts for detachably mounting said bow-shaped member on said tractor in a position in which said bow-shaped member extends in front of the hood of said tractor body substantially transversely to the driving direction, means pivotally supporting said three point suspension means including said upper member and said two lower members, said cylinder and piston means and said lifting shaft on said bow-shaped member and on at least some of said securing parts, said bow-shaped member being so dimensioned in height and in extent transversely to said driving direction as to constitute a protective guard for said hood against accidental collision with objects in the path of travel of said tractor.

References Cited in the file of this patent

UNITED STATES PATENTS

| | | |
|---|---|---|
| 2,134,848 | Anderson | Nov. 11, 1938 |
| 2,551,322 | Ford | May 1, 1951 |
| 2,608,924 | Bywater | Sept. 2, 1952 |
| 2,660,322 | Richey | Nov. 24, 1953 |
| 2,780,160 | Harris | Feb. 5, 1957 |
| 2,952,323 | Orelind | Sept. 13, 1960 |

FOREIGN PATENTS

| | | |
|---|---|---|
| 568,174 | Belgium | June 14, 1958 |

OTHER REFERENCES

Pflugfabrik, German printed application 1,011,206, June 27, 1957.